May 22, 1962 O. BARON 3,036,162

INTERNAL TELEPHONE SYSTEMS

Filed Aug. 27, 1958

3 Sheets-Sheet 1

Inventor
O. Baron
By Glascock Downing & Seebold
Attys.

May 22, 1962 O. BARON 3,036,162

INTERNAL TELEPHONE SYSTEMS

Filed Aug. 27, 1958 3 Sheets-Sheet 2

Inventor
O. Baron
By Glascock Downing & Seebold
Attys

May 22, 1962 O. BARON 3,036,162

INTERNAL TELEPHONE SYSTEMS

Filed Aug. 27, 1958 3 Sheets-Sheet 3

Inventor
O. Baron
By Glascock Downing & Seebold
Attys.

United States Patent Office 3,036,162

Patented May 22, 1962

3,036,162

INTERNAL TELEPHONE SYSTEMS

Owsiej Baron, 2c Sinoia St., Salisbury, Southern Rhodesia

Filed Aug. 27, 1958, Ser. No. 757,508
Claims priority, application Great Britain Nov. 20, 1957
5 Claims. (Cl. 179—39)

The present invention is concerned with improvements in or relating to telephone systems and particularly to such telephone systems as are commonly known as internal telephone systems and involve two or more stations which are inter-connectable by a conductor means to provide facilities for any station to establish communication with any other station.

An object of the invention is to provide such internal telephone systems which are of simple construction, are easy to install, and enable communication to be established between any stations, i.e. in the new telephone system, one station can be connected to one or more stations simultaneously with complete immunity from interference or overhearing by any other station or stations. In this new system, if two persons are engaged in conversation and another station is calling, the latter can be allowed to join the conversation if required. It is also possible to disconnect the station already engaged and to connect the new caller.

According to the invention, by means of connecting an alternating current from a transformer to the speech battery through a condenser, a humming or buzzing sound is produced in the receiver of a calling station when that station is calling another station. Said humming sound may also be heard when two stations are simultaneously calling a third station and said humming sound will then render conversation unintelligible between the two calling stations. The humming sound may also serve to obliterate or render unintelligible any conversation which may be picked up, for example, by inductive means, or other interference, by a calling station whose call has not been accepted by the station called.

The further features of the invention refer to special selective switching means for obtaining exclusive connections between the stations and to new arrangements of visual and/or audible calling means as will be described below.

In order that the invention may be understood and readily carried into effect an improved type of internal telephone system according to the invention will now be described, by way of example only, with reference to the accompanying drawing.

Figure 1A:
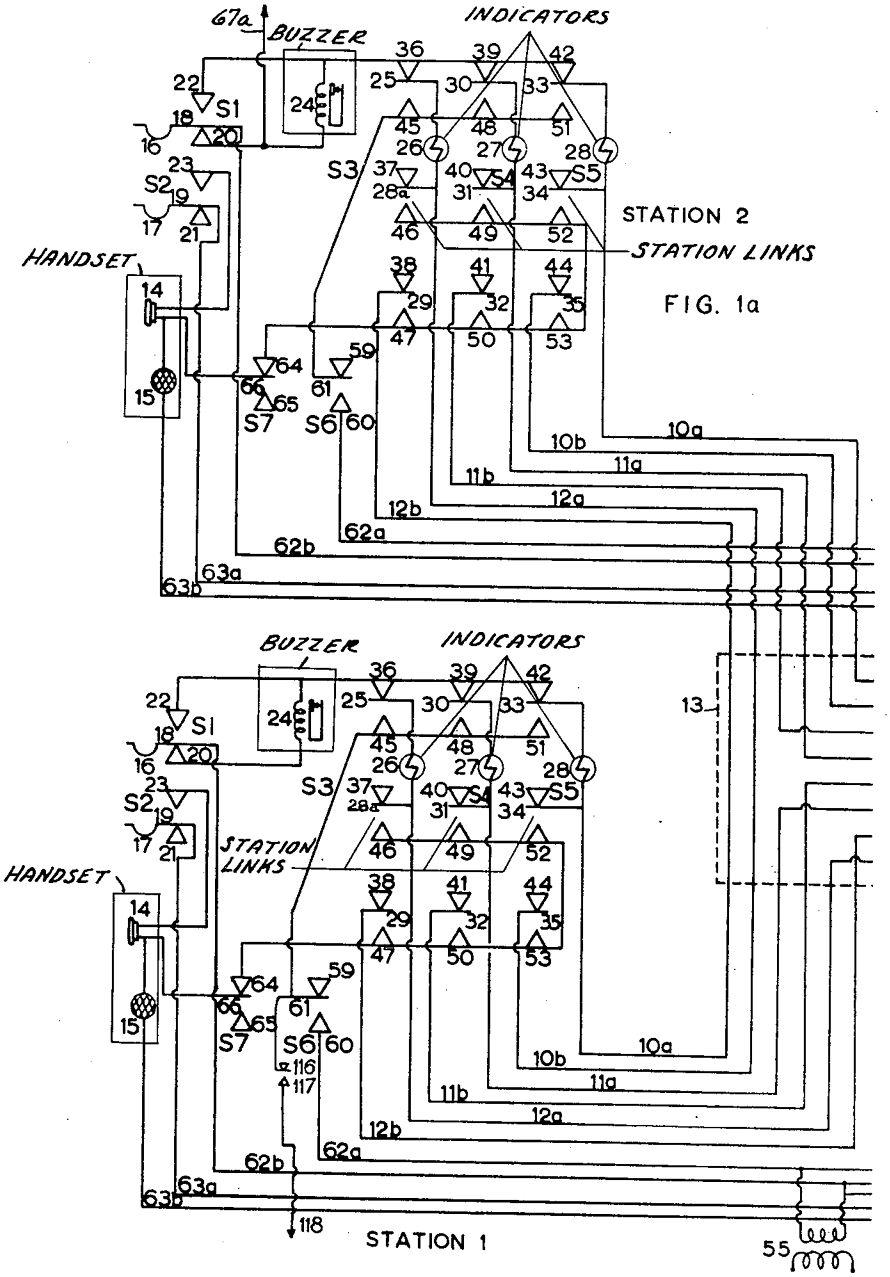
Figure 1B:
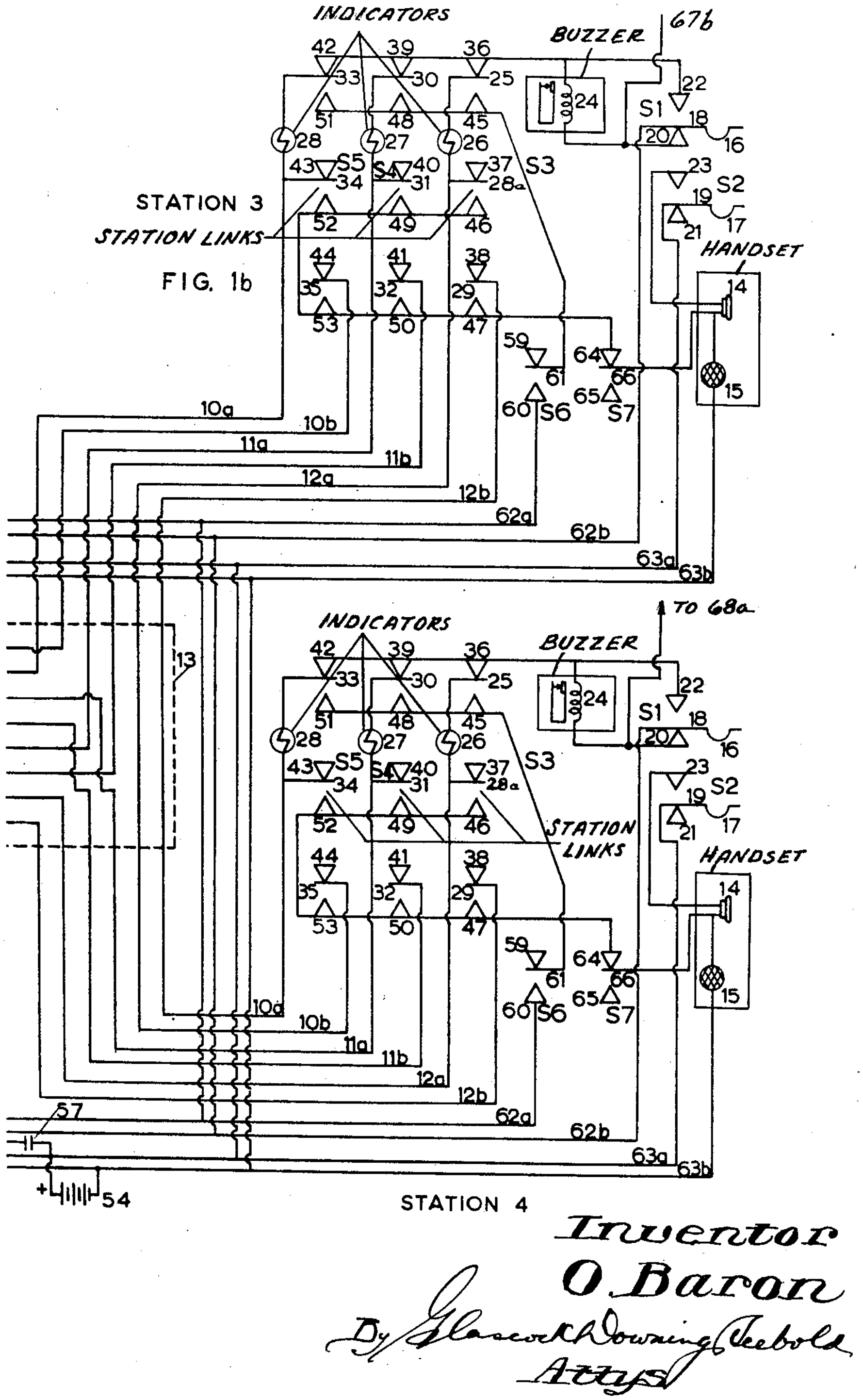

In FIGURE 1 of the drawing, the four identical stations are shown as stations 1, 2, 3 and 4 and are interconnected between themselves by means of the pairs of cables 10*a*, 10*b*; 11*a*, 11*b*; 12*a*, 12*b*; which radiate from each of the said stations. Said pairs of cables are interconnected through the junction box 13. The boundaries of the junction box 13 are indicated by means of broken lines.

An "*a*" cable of station 1 is connected through the junction box 13 to a "*b*" cable of station 2 and a "*b*" cable of station 1 is connected through the junction box 13 to an "*a*" cable of station 2. Similarly the remaining pairs of cables are inter-connected between the stations through the junction box 13, an "*a*" cable always being connected to a "*b*" cable and vice versa. It is not, however, essential that pairs of cables bearing like numbers should be connected together. For example, 12*a* could be connected to 11*b* coming from another station and 12*b* connected to 11*a*, but it would be incorrect to connect 12*a* to 11*b* coming from the same station and 12*b* to 10*a* from another station.

Each of the identical stations 1, 2, 3 and 4 comprises an ordinary hand set having a receiver 14 and a microphone 15, and the said telephone handset rests, when not in use, on the hooks 16 and 17, which actuate the moving contacts 18 and 19 of switches S1 and S2. Thus, when the said telephone handset rests upon the hooks 16 and 17, the moving contacts 18 and 19 are held onto the contacts 20 and 21, but when the handset is removed from the hooks 16 and 17, springs cause the moving contacts 18 and 19 to be held onto the contacts 22 and 23.

Each said identical station is further provided with a buzzer 24.

The buzzer 24 of each station is connected in series with the indicator lights 26, 27, 28 and each said indicator light is connected to corresponding multipole switches S3, S4 and S5 which have, respectively, moving contacts 25, 28*a* and 29; 30, 31 and 32; 33, 34 and 35. The moving contacts 25, 28*a* and 29 of S3 are insulated from one another but are mechanically linked together and are moved simultaneously by means of a push-button. Similarly the moving contacts of S4 and of S5 are linked together and are each moved by an individual push-button. For reasons of clarity the said push-buttons are not shown on the drawing.

The moving contacts of S3 are normally held by spring means onto corresponding fixed contacts 36, 37 and 38, but depression of the aforementioned push-button transfers the said moving contacts onto the corresponding fixed contacts 45, 46 and 47. Said push-button is held in the "down" position by mechanical means until released by human agency or automatically by replacing the handset on the hooks 16 and 17. Similarly push-button control of S4 and S5 transfers the moving contacts of these switches from fixed contacts 39, 40 and 41, to fixed contacts 48, 49 and 50, and from fixed contacts 42, 43 and 44, to fixed contacts 51, 52 and 53, respectively.

The aforementioned pairs of cables 10*a*, 10*b*; 11*a*, 11*b*; 12*a*, 12*b*; are connected to the contacts of switches S3, S4 and S5 in the manner shown in the drawing.

The electrical storage battery 54 provides a direct current electrical supply to energize, as required, the handsets of the stations of the system and the battery 54 is connected across the cables 63*a* and 63*b* which are interconnected to all the stations of the system. The positive terminal of the battery 54 is connected to cable 63*a*.

A transformer 55 provides an alternating current electrical supply to energize the buzzers 24, as required, and provides a common supply for this purpose to all the said stations through the cables 62*a* and 62*b*.

The condenser 57, is arranged between the positive terminal of the battery 54 and one low voltage terminal of the transformer 55 in order to make available a humming or buzzing sound in the receiver 14 of the handset of any station, to obliterate or render unintelligible conversations which might otherwise be overheard due to inductive effects in the wiring or to make conversation impracticable between two stations which happen simultaneously to call a third station or group of connected stations.

The switch S6 having the fixed contacts 59 and 60, and the moving contact 61, is provided as a means of calling a station or stations when that or those station(s) has or have been selected by means of S3, S4 or S5, or the appropriate combination thereof. When S6 is pressed in for calling, S7 switches off automatically the handset 14 and 15 so as to prevent the alternating current to flow to the handset.

The method of operation of the improved type of internal telephone system just described is as follows:

If station 1 wishes, for example, to call station 3, the handset of station 1 is lifted from the hooks 16 and 17. The said handset is then energized from the battery 54 through the contacts 19 and 23 of S2, and electrical energy is made available from the transformer 55 to S3, S4 and S5 by the closing of the contacts 18 and 22 of S1.

If it is desired to call station 3, the push-button controller S4 is pressed, closing the contacts 30 and 48; 31 and 49; 32 and 50.

The closing of contacts 30 and 48, and 31 and 49, respectively, connects the indicator lamp 27 to switches S6 and S7. The light of lamp 27 will be indicating that connection has been established when switches S6 and S7 are pressed down, S6 being a signal switch.

The closing of contacts 32 and 50 connects the handset of station 1 to the interconnecting cable 11*a* which is itself connected through the junction box 13 to the interconnecting cable 11*b* from station 3. At the same time, cable 11*b* from station 1 is connected to cable 11*a* coming from station 3.

Interconnecting cables 11*a* and 11*b* at station 1 are therefore connected together and to the same point on the handset of station 1.

Switch S2 having been closed, with the results just described in detail, the call button actuating S6 and S7 is pressed and contacts 61 and 60, and 65 and 66, become closed. The interconnecting lines 11*a* and 11*b* are therefore disconnected from the handset of station 1 until the button actuating S6 and S7 are released. While the button actuating S6 and S7 is pressed current flows from cable 62*a*, through contacts 61 and 60, through contacts 32 and 50, to interconnecting cable 11*b*. Cable 11*b* is connected through the junction box 13 to cable 11*a* of station 3. Cable 11*a* of station 3 is connected to contact 31 of S4 of station 3. Contacts 31 and 40 are in the closed position and cable 11*a* of station 3 is therefore connected to the signal lamp 27 and to the buzzer 24. The circuit is completed through the closed contacts 18 and 20 of S1 of station 3, to cable 62*b*, and the signal lamp 27 therefore lights, indicating that station 1 is calling, and the buzzer 24 of station 3 sounds.

The call from station 1 is accepted at station 3 by closing S4 by means of the appropriate push-button and by lifting the handset of station 3 off the hooks 17 and 18. The handset is energized and connected to interconnecting cable 11*b* in the manner already described with reference to station 1. The indicator light 27 in station 3 remains alight if in station 1 switches S6 and S7 are held down. By pressing down switch S4 in station 3 the light will be cut off indicating that the call connection is established.

The effect of closing contacts 31 and 49, and 32 and 50 of S4 of station 3 is to connect cables 11*a* and 11*b* together at station 3, in the same manner that cables 11*a* and 11*b* have been connected together at station 1. By this means the effective resistance of the exclusive interconnecting conductor between the two stations is halved.

The replacing of the handsets on the hooks 16 and 17 at the termination of a conversation automatically opens S4 of both stations, and both stations are then cleared for further calls.

Secrecy of conversation is assured between two or more stations or a number of groups of stations due to the fact that the appropriate switch(es) S2, S3 or S4 must be closed at each station concerned, before conversation is possible. For example, if stations 1, 2 and 3 are interconnected and a conversation is in progress, two out of the three switches S3, S4 and S5, will be closed in each of the stations 1, 2 and 3. If now station 4 calls any or all of stations 1, 2 or 3, the open switch of S3, S4 and S5 will connect the calling signal through the appropriate signal light 26, 27 or 28, but because the handset of the station being called is already lifted, and the contacts 18 and 20 of S1 are therefore open, the buzzer(s) 24 will not sound, but the signal lamp will operate. The call from station 4 may however be accepted by the station or stations called but until such acceptance is made by the closing of the appropriate S3, S4 or S5 at the receiving station, conversation between stations 1, 2 and 3 remains secret from station 4, and all that will be heard at station 4 will be a hum induced as aforementioned by the connection of the condenser 57.

In the drawing only four stations have been shown, but any convenient number of said stations may be interconnected, in a manner indicated in the drawing, to constitute an improved type of internal telephone system according to the invention.

Briefly, therefore, when it is desired to make a call from any station, the handset at the calling station is lifted and the appropriate switch of S3, S4 or S5 closed by pressing in the appropriate button. The actuating button of S6 and S7 is now pressed intermittently or continuously, and this operates the buzzer and lights the appropriate signal light at the station called, and also on the calling station. At the station called the handset is lifted and S3, S4 or S5, corresponding to the signal light, is closed by pressing the appropriate button. The two stations are now connected for conversation.

A further feature of the invention is a new arrangement of a microphone loudspeaking system which is incorporated in the above described telephone system. Such arrangement is shown diagrammatically in FIG. 2 which is an additional switching means to any of the stations. This additional switching means can be incorporated in any of the stations as a microphone loud-speaker master station. Only one of these additional units can be used for a system.

If for instance, station 1 is selected to be used as a microphone loudspeaking station, and it should be brought into loudspeaking connection with stations 2, 3 and 4, further switches S8, S9, S10 and S11 are added to station 1. As will be explained, below, the new arrangement does not restrict this selected station 1 to microphone loudspeaking conversation, but it allows also ordinary telephone conversation as required. Moreover, it can be brought simultaneously into microphone loudspeaking connection with other stations, say stations 2 and 3 and to ordinary telephone connection with station 4, or vice versa.

While stations 1, 2, 3 and 4 comprise in general the switching means, and microphone loudspeakers, station 1 contains also a transistor audio amplifier in order to provide means for sound amplification when station 1 is calling another station or stations. Also a separate battery 120 is provided to energize the transistor amplifier.

Station 1 can get through to stations 2, 3 or 4 even if the latter are already engaged in conversation between themselves without interrupting that conversation. If, for instance, stations 2 and 3 are speaking telephonically, they can also converse with station 1 through the loudspeakers.

In the drawing, S8 indicates a "speak-listen"-switch while switches S9, S10 and S11 are selector switches. When station 1 is initiating a loudspeaking call to, say, station 3, switch S10 is pressed down, closing contacts 94 and 96, which are incorporated in switch S10; thereby the microphone loudspeaker of station 3 is connected through cable 65*b* to station 1. At the same time, contacts 95 and 97 will also be closed and they will light up a pilot-bulb at station 1 to indicate that the other station is being called; the light remains on until after the finished conversation the pressed button is released. To energize the pilot-bulbs of switches S9, S10 and S11, cables coming from pilot-bulbs of switches S9, S10 and S11, must be connected across cables 62*a* and 62*b*. Furthermore, at the same time, contacts 100 and 102 are closed and they switch in the transistor amplifier. To energize the amplifier, contact 100 of S10 is connected to cable 66*b* which, in turn, is connected to the positive pole of the separate battery 120 while contact 102 is connected to the amplifier chassis. The negative pole of the separate amplifier battery is connected to the amplifier.

Figure 2:
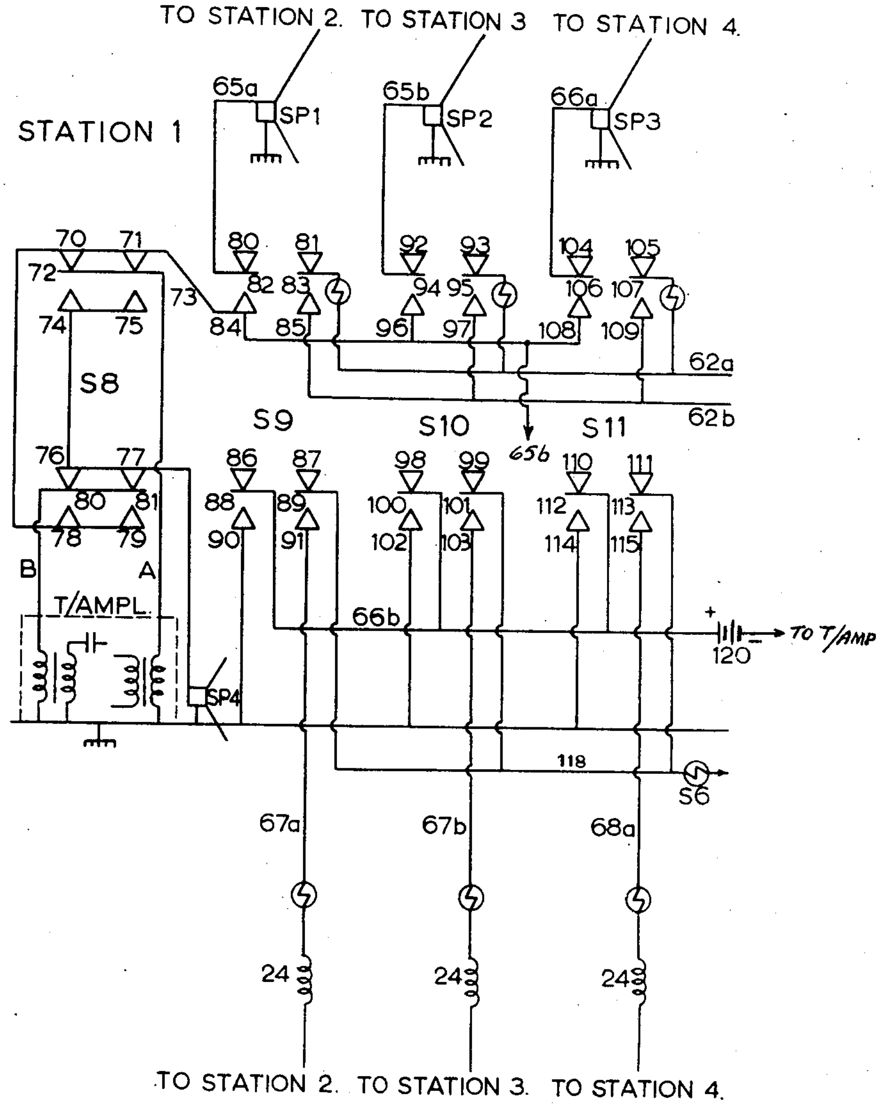

When switch S10 is pressed down also contacts 101 and 103 are closed which are connected to buzzer 24 in series with an indicator lamp at station 3 through cable 67*b*; contact 101 is connected to contacts 116—117 of switch S6 (FIG. 1), through another indicator lamp at station 3 as shown in the drawing; wire 118 shown in FIGURES 1 and 2 indicates the connection to the contacts 116—117 of S6; therefore when station 1 calls station 3 and when signal switch S6 is pressed down, an indicator lamp will light up at station 3 and will operate the buzzer 24. An indicator lamp will also light up at the calling station 1 indicating that the call is being received at station 3. However, if station 3 is engaged telephonically to say, station 2, the indicator lamp will light up at station 3, but the buzzer will not sound since contacts 18, 20 are open; the signal lamp at station 1 (calling station) will also light up. The "speak-listen"-switch S8 operates in the following manner:

When station 1 initiates a microphone loudspeaking call to station 3 then the handset S1 and S2 of station 1 is not lifted and switch S10 is pressed down, as described above, and S6 is then pressed continuously or intermittently and the indicator lamp at station 1 will light up and also an indicator lamp at station 3 and the buzzer will sound. The indicator lamp and buzzer at the called station (station 3) has the purpose of attracting attention. Of course, calling station 1 can get through without giving signals at all, merely by pressing down push-button of S10 and operating S8 "speak-listen"-switch. After the calling station (station 1) receives identification through the microphone loudspeaker SP4, loud conversation can take place. In order to speak back to station 3 (called station) "speak-listen"-switch S8 of station 1 (calling station) is pressed down for conducting conversation. The contacts 70, 71, 78 and 79 are connected in parallel. (The reason for connecting in parallel is merely mechanical; it gives better protection for the contacts against wear.) Contacts 74, 75, 76 and 77 are also connected in parallel. Finally, contacts 72 and 73 and also contacts 80 and 81 are in parallel connection. Contacts 70, 71, 78 and 79 of S8 are connected to the selector switches. Contact 84 of S9, contact 96 of S10, contact 108 of S11, are interconnected, and contacts 72 and 73 of S8 are connected to the secondary of the output transformer of a transistor audio amplifier. Contacts 76 and 77 are connected to loudspeaker SP4 of station 1 (calling station) and contacts 80 and 81 are connected to the primary of the microphone input transformer of the transistor audio amplifier.

To further explain the function of the "speak-listen"-switch S8 and as shown in the drawing, when calling station 1 is initiating a call to say, station 3, switch S10 is pressed down at station 1 where contact 94 and cable 65*b* at station 3 are permanently connected to microphone loudspeaker SP2; contact 96 connects itself to contact 94 at station 1. 96 is permanently connected to switch S8 of station 1. Contacts 70, 71, 78 and 79 are shown in the drawing in the position of the "speak-listen"-switch being in the "up" position (released position.) The microphone loudspeaker SP2 of station 3 is now connected to contacts 72 and 73 of S8 in station 1; contacts 72 and 73 in this position of S8 are connected to the secondary of the output transformer of the transistor audio amplifier. SP2 of station 3 then operates as a loudspeaker to listen in and microphone loudspeaker SP4 of station 1 is permanently connected to contacts 74, 75, 76 and 77; contacts at this ("up") position touch contacts 80 and 81 which are permanently connected to the microphone "input" transformer of the transistor audio amplifier. SP4 of station 1 acts as a moving coil microphone.

The position of SP2 of station 3 and SP4 of station 1 is reversed when the "speak-listen"-switch is pressed down. The position of the "speak-listen"-switch S8 can also be reversed; e.g. for speaking S8 can be pressed down and for listening S8 can be released. This can be done by transferring wire A from contacts 72 and 73 to contacts 80 and 81 of wire B and transfer wire B from contacts 80 and 81 to contacts 72 and 73 of wire A.

Although, by way of example, station 1 has been selected to be the controlling and operation microphone loudspeaker station, the secrecy of telephone conversations is unaffected if the station is used when operating the microphone loudspeaker. Multiple telephone conversations with any number of stations can be conducted in secrecy. Station 1 can, alternatively converse with certain stations by microphone loudspeaker and with other stations telephonically at the same time.

Station 1 has two switches for each station and separate conductors. When, for example, station 3 initiates a call to station 1, the latter can choose whether to speak telephonically or by microphone loudspeaker. If at station 1, S4 to station 3 is pressed down, the conversation will be held telephonically both ways; if at station 1, switch S10 to station 3 is pressed down, conversation will be held by microphone loudspeaker both ways. Station 1 is not restricted to the use of two switches for each station. It can, for example, have switches S3, S4 and S5 for telephoning in secrecy only and other switches S9, S10 and S11 for microphone loudspeaking to other stations not shown in the drawings.

Various modifications and improvements within the scope of the invention may be made and it will therefore be appreciated that the invention is not restricted to the particular manner in which it is carried into effect as indicated in the accompanying drawing. Variations may be made to suit particular circumstances.

What I claim is:

1. In an intercommunicating telephone system including at least three stations each having a telephone handset, individual calling and telephone circuits extending between each station and every other station, a plurality of selectively operable switches at each station for respectively energizing the individual calling circuit to any other station and connecting the calling station to the telephone circuit extending therefrom to a called station, switch means operated by the corresponding selectively operable switch at the called station for connecting it to the telephone circuit extending between it and the calling station, an alternating current source normally coupled to all of said telephone circuits for inducing a hum therein and switch means concurrently controlled by the corresponding selectively operable switch at both the calling and called station for decoupling the alternating current source from the individual telephone circuit extending between the calling and called stations, whereby the alternating current source remains connected to the telephone circuits of the uncalled stations to provide a hum therein.

2. In an intercommunicating telephone system according to claim 1, a pair of visual signals serially connected in each calling circuit, one at each station, and switch means controlled by the selectively operable switch at a calling station for energizing a calling circuit to provide an indication to the called station of the identity of the calling station.

3. In an intercommunicating telephone system according to claim 2 further including an audible signal device at each station connected in parallel to all of the calling circuits and rendered operable upon energization of a calling circuit by a calling station, and means at a called station for rendering said audible signal inoperative.

4. In an intercommunicating telephone system according to claim 2 in which the switch means controlled by the selectively operable switch at a calling station includes means for connecting the calling circuit to the alternating current source.

5. In an intercommunicating telephone system in accordance with claim 1, an additional telephone circuit extending between the stations, a further plurality of selectively operated switches at one station, a further calling indicator at each of the other stations selectively energizable by the individual calling circuit upon operation of a selected one of the further plurality of switches, a moving coil loudspeaker-microphone device at each station, means controlled by operation of the selected one of the further plurality of switches for connecting the loudspeaker-microphone device of the selected station to the additional telephone circuit, a loudspeaker microphone and a talk-receive switch at the one station for conditioning it to receive or transmit signals on the additional telephone circuit, whereby the one station may have respective loud-speaking and telephonic communication with two other stations simultaneously.

References Cited in the file of this patent

UNITED STATES PATENTS 2,287,127 Philips ---------------- June 23, 1942